United States Patent [19]

Fehn

[11] Patent Number: 5,507,624
[45] Date of Patent: Apr. 16, 1996

[54] SLUDGE PUMP

[75] Inventor: Berthold A. Fehn, Krefeld, Germany

[73] Assignee: Friedrich Wilhelm Schwing GmbH, Herne, Germany

[21] Appl. No.: 365,514

[22] Filed: Dec. 28, 1994

Related U.S. Application Data

[63] Continuation of Ser. No. 33,877, Mar. 19, 1993, Pat. No. 5,388,965, which is a continuation-in-part of Ser. No. 981,982, Nov. 24, 1992, Pat. No. 5,257,912, which is a division of Ser. No. 595,457, Oct. 10, 1990, Pat. No. 5,106,272.

[30] Foreign Application Priority Data

Mar. 21, 1982 [DE] Germany .................. 42 09 256.6

[51] Int. Cl.$^6$ .................................................. F04B 21/00
[52] U.S. Cl. .................. 417/53; 417/63; 417/900; 73/239
[58] Field of Search .................. 417/53, 63, 342, 417/900, 317; 73/3, 239, 168

[56] References Cited

U.S. PATENT DOCUMENTS

| | | |
|---|---|---|
| 3,650,638 | 3/1972 | Cole . |
| 4,543,044 | 9/1985 | Simmons . |
| 4,545,736 | 10/1985 | Walton . |
| 4,558,593 | 12/1985 | Watanabe et al. .................. 417/63 |
| 4,781,066 | 11/1988 | Pope et al. . |
| 4,790,728 | 12/1988 | Dwyer . |
| 4,938,054 | 7/1990 | Dye et al. . |
| 5,318,409 | 6/1994 | London et al. ..................... 417/63 |
| 5,336,055 | 8/1994 | Anderson ........................... 417/63 |
| 5,401,140 | 3/1995 | Anderson ........................... 417/63 |

*Primary Examiner*—Charles Freay
*Attorney, Agent, or Firm*—Kinney & Lange

[57] ABSTRACT

The present invention is a sludge pump system which includes a means for monitoring operation of a sludge pump. The sludge pump includes a material cylinder and a piston moveable in the material cylinder. A pump drive moves the piston during working cycles which include a pumping stroke and a filling stroke. A pump valve mechanism connects the material cylinder to an outlet during pumping strokes and connects the material cylinder to an inlet during filling strokes. A means for monitoring operation of the pump is provided. The means for monitoring includes a means for sensing a first parameter related to operation of the pump drive, a means for sensing a second parameter indicative of operation of the piston, and a means for determining errors in the operation of the pump based upon the first parameter and the second parameter.

28 Claims, 11 Drawing Sheets

5,507,624

1

SLUDGE PUMP

This is a continuation application of U.S. application Ser. No. 08/033,877, filed Mar. 19, 1993, now U.S. Pat. No. 5,388,965, which is a continuation-in-part of U.S. application Ser. No. 07/981,982, filed Nov. 24, 1992, and which has issued as U.S. Pat. No. 5,257,912 which is a divisional application of U.S. application Ser. No. 07/595,457, filed Oct. 10, 1990, and which has issued as U.S. Pat. No. 5,106,272. Priority of the prior application is claimed pursuant to 35 USC § 120.

BACKGROUND OF THE INVENTION

The present invention relates to the transport of a stiff-pasty material. The invention relates in particular to a sludge transport system wherein a positive-displacement sludge pump conveys the sludge through a pipeline, with the amount conveyed per unit of time and the total amount of material conveyed being determined automatically.

In recent years sludge pumps have become increasingly widespread for transporting sludges through a pipeline in municipal and industrial applications. Sludge pumps offer a number of crucial advantages over worm or belt conveyors. Pumping sludge through a pipeline means enclosing odors and thus a safe and secure work place. Sludge pumps are suitable for transporting thick, heavy sludges for which belt or worm conveyors are virtually useless. This is particularly important when the sludges are to be dried and burned in an incineration plant. The pipeline has little or no wear; it is much cheaper to maintain than worm or belt conveyors. The pump and pipeline take up less space and can convey the material through changes of direction by simple elbows. Sludge pumps furthermore offer a reduction of noise compared to mechanical conveyors and also work more cleanly and without soiling.

On the one hand, numerous federal laws and regulations control the processing and dumping of sludges and require that the processor precisely determine and record the amount of processed material.

On the other hand, since such pumps are increasingly used in complex plants, extreme availability is required. These plants include for example sludge incinerating plants, coal power plants and certain functional processes. The sludge pumps form a part of the plant which is frequently responsible for a complicated sludge flow and serves to supply the sludge, feed the sludge into the sludge pump and possibly to transport and dose the sludge at a certain place in the plant. In such and similar cases of application one generally wants to be able to plan and carry out the maintenance and servicing of the crucial units of these parts of the plant in advance so as to prevent unexpected breakdowns. These requirements are of special importance when standby pump systems cannot be used e.g. due to excessive costs so that symptoms of imminent wear must be recognized in time.

SUMMARY OF THE INVENTION

The invention is based on the problem of providing a system which makes it possible to detect and report imminent functional defects or incipient wear by continuously determining the effective amount of sludge conveyed per unit of time and thus also the volumetric fill factor of the pump in comparison to the theoretical sludge pumping rate, and by constant functional monitoring.

2

This is done according to the invention substantially by linking indicators of the hydrostatic pump drive and control elements with parameters of the sludge pump that are derived from the working cycle of the material piston in the material cylinder. By comparing the switching functions of the hydrostatic drive with the piston cycles one can determine deviations from set values and actual values which, when they exceed or fail to reach a certain degree, herald or already identify functional defects.

This applies equally to one-cylinder and multicylinder pumps, a special feature being that with two-cylinder sludge pumps comparisons can constantly be drawn between successive, similar working cycles of the two cylinder units from the interplay between the feed pump and its hydraulic drive assembly.

The invention also permits useful analysis of the individual working steps within one or more successive working cycles of the particular cylinder unit under consideration, and with two-cylinder pumps also comparison with the corresponding working step of another similar cylinder with the aid of measurements and evaluations of deviations between the set working steps and/or fixed, set values. This permits conclusions to be drawn which display imminent or already existing signs of wear, and which can then be reported.

Available indicators or parameters are pressures, position messages of end positions of the material piston, open and closed positions of valves and the end positions of the hydraulic control valves, as well as positions of the quantity governor of the hydraulic pump and the time intervals between the individual measuring points of the indicators and parameters.

Since a pump has the function of transporting a certain required amount of sludge it appears very important to determine the percentage fill continuously for each stroke and to monitor continuously its constancy within a permissible tolerance.

Almost all conceivable disturbances such as wear, defects, valve stem functional defects, misadjustment of controllers, etc., have a directly detrimental influence on the total throughput of the pump and often primarily on the percentage fill.

Systems for determining the percentage fill are known per se, for instance from the Applicant's U.S. Pat. No. 5,106, 272. However they shall be briefly explained here again for the sake of completeness due to the linkage with other parameters and indicators.

The percentage fill or volumetric efficiency results from the fact that it is normally not possible to fill the cylinder to 100% of its known volume in positive-displacement pumps.

With pasty or even compact sludges or filter cakes a distance arises between the filling piston and the column of sludge it draws in due to the often low preliminary pressure on the filling side, and this distance becomes greater during the filling stroke. It becomes greater the higher the resistance to flow is in the material cylinder to be filled and the more gas pockets there are in the sludge.

In other words, the filling material piston moves ahead of the column of sludge thereby producing between itself and the column of sludge an empty volume of varying size in which underpressure prevails but no sludge is present.

Thus, part of each discharging stroke of the pump involves only an elimination of this empty space and a compression of the sludge in the cylinder before the pressure of the piston overcomes the pressure prevailing at the outlet of the pump and conveys the material from the cylinder into the pipeline. Therefore, at least one working parameter of the pump is measured according to the invention in order to determine the point during the pumping stroke at which the hydraulic pressure on the piston suffices to overcome the outlet pressure and the sludge passes out of the cylinder. This information is used to determine the actual volume that is conveyed during the pumping stroke. By adding the volumes pumped during each stroke one obtains a volume sum. By dividing the actually pumped volume during a working cycle by the time this required one can determine an amount pumped during a certain period.

In a known embodiment the pump has an outlet valve between the cylinder and the outlet which opens when the pressure in the cylinder has reached the pressure at the outlet. The opening of the outlet valve is measured and the period from opening of the outlet valve until the end of the pumping stroke is determined. The measured period is compared with the total period from the beginning until the end of the pumping stroke. The result is the fill factor as a percent of the total volume of the cylinder during each pumping stroke.

A further embodiment of the invention likewise uses a pump with an outlet valve which opens when the pressure in the cylinder has reached the pressure at the pump outlet. A limit switch measures the position of the piston on the cylinder at the moment when the outlet valve opens. This represents information on the volume that is conveyed during a given pumping stroke.

In a further embodiment the outlet valve of the pump is open during the total pumping stroke and the hydraulic pressure driving the piston is measured in comparison to the outlet pressure and either the time or the piston position in the pumping stroke determined when the hydraulic pressure reaches the set outlet pressure. This can serve to determine a percentage fill or a volume which is conveyed during each pumping stroke.

In a further embodiment the function of the hydraulic pressure is analyzed to determine the time at which the rate of increase of the hydraulic pressure pattern approaches the value 0. This shows that the hydraulic pressure has risen so far that it corresponds to the pressure in the delivery pipe and the sludge is being pumped out of the cylinder. By determining either the linear position of the piston or the relative time in which the rate of pressure increase becomes 0 and relating this to the beginning and end of the pumping stroke, one determines the percentage fill of the cylinder and thus the pumped volume during each pumping stroke.

The above statements make it possible to provide accurate measurement of the particular pumping rate, the cumulative pumped volumes and the pumping efficiency according to the invention.

The inventive importance of detecting and monitoring further indicators and parameters is shown by the following.

The throttle valves in the hydraulic circuit of the pump drive are of crucial importance for the functioning of the inventive pump, i.e. the correct sequence of the switchover of the pump valves or pump gate via hydraulic valve and gate drives.

The chronological sequence of the changeover of the pump valves is also correlated with the pistons in the material cylinders. The width of opening of the throttle valves is thereby monitored such that the throttle valves are neither open too far nor closed too far. This makes it possible for the open pressure or suction valve to close before the direction of motion of the material pistons is switched over.

A further indicator that can be used is the hydraulic pressure in the hydrostatic pump drive. This pressure is correlated with the delivery pressure of the sludge transport. One can then determine precisely whether the pump valves usually designed as poppet valves are functioning correctly or whether they show signs of wear.

Here, not only the functions of the sludge pump but also the functions of the hydrostatic drive are monitored and any errors displayed. It is therefore possible to determine a particular functional defect in terms of whether it is in the units of the pump responsible for transport or in their hydraulic drive. However the correct functioning of the sludge pump does not depend only on the correct working of the units necessary for sludge transport and their hydrostatic drive. The usually desired uniform transport is also essentially dependent on the functioning of the sludge feed to the pump. This determines the correct material cylinder fill. This can be checked and optionally displayed with the features of the present invention. It is done substantially by determining any differences in the volumetric efficiencies of transport and their deviations from set limiting values.

On the other hand the correct functioning of the sludge pump is not dependent alone on the hydrostatic drive of its unit. Errors can also arise from energy losses occurring in the hydrostatic drive. The monitoring of the sludge pump for such errors is possible with the present invention. Amounts of leaking oil, e.g. of the hydraulic pump, the control valves or the consumers, are determined that indicate functional errors as soon as they exceed a certain degree.

These amounts of leaking oil are of greater importance than the pressures that can be sensed. The features of the present invention make it possible to determine roughly whether the hydraulic control valves and the poppet/pump valves are reaching their set end positions, and thus to ascertain whether errors are occurring at these places. But such a display can be suppressed when the hydraulic drive is impaired simultaneously because the amounts of leaking oil are too great.

The hydrostatic drive of the sludge pump can of course function properly only if the pressure generator is functioning correctly. An embodiment of the invention, therefore also involves monitoring the pressure generator. This is done by comparing the set times of the piston travel in the material cylinder with the actual values.

The details, further features and other advantages of the invention are found in the following description of embodiments of the invention with reference to the Figures in the drawings. Two-cylinder reciprocating pumps are chiefly shown, which are also the object of the following detailed description.

DETAILED DESCRIPTION OF THE PREFERRED EMBODIMENTS

Figure 1:
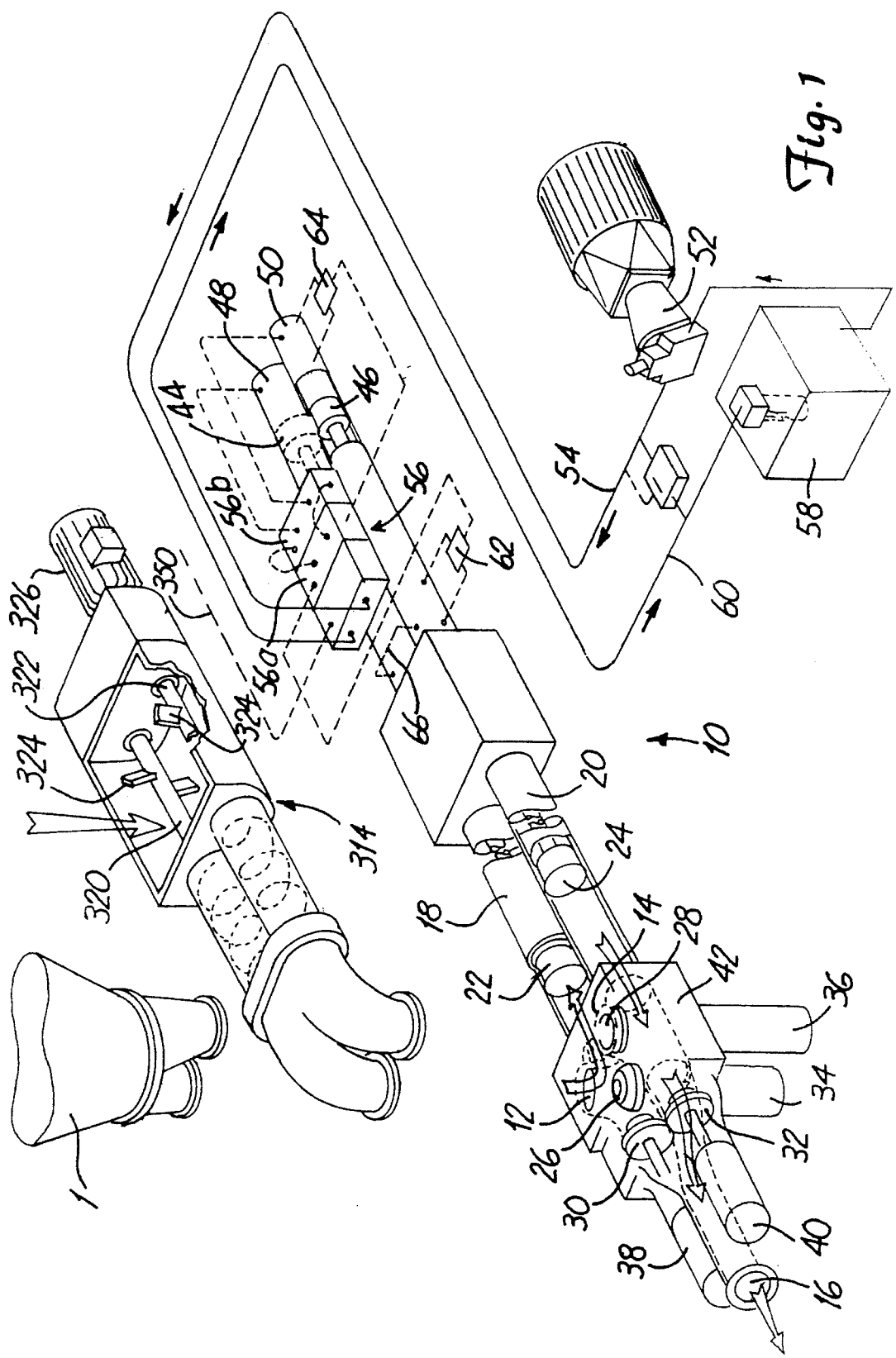
FIG. 1 shows a perspective and broken away view, with certain portions omitted, of a two-cylinder sludge pump system which uses inlet and outlet popper valves.

FIG. 1 shows a two-cylinder hydraulically driven sludge pump 10. A high-solids sludge either held in a hopper 1 or fed via a continuous transporter 314 passes inlets 12, 14 and is pumped through outlet 16 into a pipeline (not shown). Pump 10 includes a pair of rigid cylinders 18, 20 in which a pair of fixed pistons 22, 24 reciprocate. Inlet poppet valve 26 controls the flow of sludge from inlet 12 into cylinder 18. Similarly, poppet valve 28 controls the flow of sludge from inlet 14 into cylinder 20. The flow of sludge from cylinders 18, 20 to outlet 16 is controlled by poppet valves 30, 32.

Inlet popper valves 26, 28 are controlled by hydraulic inlet popper valve drive cylinders 34, 36. Outlet poppet valves 30, 32 are operated by hydraulic outlet poppet valve drive cylinders 38, 40.

In the position shown in FIG. 1, inlet poppet valve 26 and outlet popper valve 32 are open. Piston 22 therefore moves away from popper valve housing 42, while piston 24 runs toward poppet valve housing 42. Sludge is drawn through inlet 12 into cylinder 18, while sludge is pumped from cylinder 20 into outlet 16.

Material pistons 22, 24 are connected to hydraulic drive pistons 44, 46 which move in hydraulic cylinders 48, 50. Hydraulic fluid is pumped from hydraulic pump 52 through high-pressure line 54 to control valve block 56. Control valve block 56 includes two spool valves 56a, 56b which control the sequencing of high- and low-pressure hydraulic fluid to hydraulic cylinders 48, 50 and to poppet valve drive cylinders 34, 36, 38, 40. Low-pressure hydraulic fluid flows from valve block 56 back to hydraulic reservoir 58 through low-pressure line 60.

Forward and rear switching valves 62, 64 signal the position of piston 46 at the forward and rear ends of travel and are connected to control valve 56a. Each time piston 46 reaches the forward or rear end of its travel in cylinder 50 a valve sequence is initiated which acts on all four poppet valves so that they change from the occupied position to the opposite one, and reverses the high- and low-pressure connections to cylinders 48, 50, and whereby first only the valves that were open close, leading to an intermediate state in which all four valves are closed. The valves that were closed open only when the pressure conditions on the material pistons change accordingly at the start of the new pumping cycle. (Relief for the previously closed suction valve and loading for the previously closed pressure valve.)

The sequence of operations of pump 10 is essentially as follows.

As shown in FIG. 1, cylinder 20 discharges its sludge at outlet 16 while cylinder 18 loads its sludge from inlet 12. At the end of the pumping stroke material piston 24 is in the direct vicinity of poppet valve housing 42 while piston 22 has reached its point furthest from valve housing 42.

At this point valve 62 receives the signal that hydraulic drive piston 46 has reached the forward end of its stroke. Valve slide 56a is activated which causes all poppet valve drive cylinders to be actuated, whereby, as mentioned above, first only valve drive cylinders 34, 40 are actuated due to the prevailing pressure conditions. This causes inlet popper valve 26 and outlet valve 32 to close and thus attains the state in which all four poppet valves are closed.

At this point pistons 22, 24 are at the ends of their stroke and thus at the point where their direction of motion is about to reverse.

All four poppet valves 26, 28, 30, 32 are closed. At the start of the new stroke hydraulic pressure increases in cylinder 48, which drives piston 44 forward. This moves piston 22 toward valve housing 42. Piston 22 is now switched to its pumping or discharging stroke. At the same time the hydraulic pressure prevailing forward of piston 44 is transferred from cylinder 48 through interconnection 66 to the forward side of cylinder 50. This applies hydraulic pressure to the front side of piston 46 to move it in a rearward direction. As a result piston 24 begins moving away from housing 42 and performs its loading or filling stroke.

When the effect of the opening pressure on drive cylinder 36 for inlet valve 28 on inlet 14 exceeds the effect of the pressure in cylinder 20, inlet valve 28 opens and allows sludge to flow through inlet 14 into cylinder 20 during the filling stroke.

When the piston moves forward it first eliminates the empty space that has arisen and then compresses the sludge within cylinder 18. At the moment when the compressed sludge in the pumping cylinder equals the pressure of the compressed sludge in the delivery pipe at outlet 16, poppet valve 30 opens. Since the poppet valve for the discharging cylinder opens only when the cylinder content has the same pressure as in the pipeline, no material can flow back.

The operation continues, with piston 22 moving forward and piston 24 moving rearward until the pistons reach the end of their respective strokes. At that point switching valve 64 causes all four valve drive cylinders to be pressurized with the similar sequence as described above for the switching of valve 62.

The operation continues with one material piston 22, 24 operating in a filling stroke while the other is operating in a pumping or discharge stroke.

Figure 2:
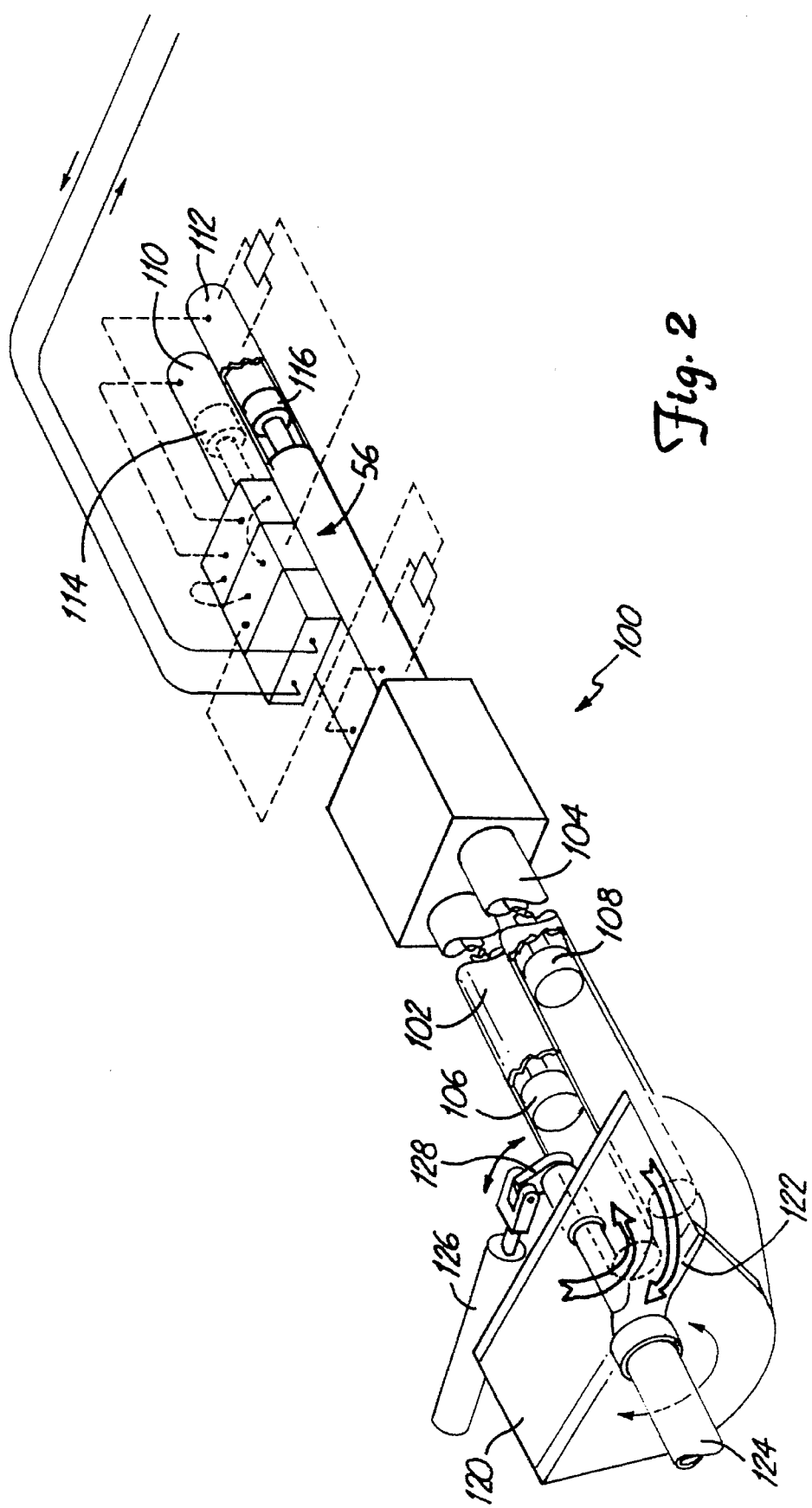
FIG. 2 shows a perspective and partly broken away view of a portion of the two-cylinder sludge pump having a pivoting gate or transfer tube valve.

FIG. 2 shows a perspective view of a two-cylinder sludge pump 100 having a pivoting gate or transfer tube valve (tube switch) 122 as opposed to the poppet valve arrangement shown in FIG. 1. Pump 100 includes a pair of cylinders 102, 104 in which material pistons 106, 108 reciprocate. Hydraulic drive cylinders 110, 112 with drive pistons 114, 116 are connected to material pistons 106, 108. Valve assembly 56 controls the sequencing of motion of pistons 114, 116 of the hydraulic drive cylinders, and thus the motion of pistons 106, 108 in material cylinders 102, 104. Sludge is supplied to store tank 120 in which a pivoting transfer tube 122 is positioned. Transfer tube 122 connects outlet 124 with one of the two material cylinders (in FIG. 2 outlet 124 is connected to cylinder 104), while the other material cylinder(in this case cylinder 102) is open to the interior of filling hopper 120. In FIG. 2 piston 108 moves forward in a discharge stroke to pump sludge out of cylinder 104 into outlet 124, while piston 106 moves rearward to draw sludge into cylinder 102.

At the end of a stroke hydraulic drive 126 which is connected to pivot arm 128 causes transfer tube 122 to swing so that outlet 124 is now connected to cylinder 102. The direction of motion of pistons 106, 108 reverses, with piston 106 moving forward in a pumping stroke while piston 108 moves backward in a filling or loading stroke.

Hydraulic fluid to operate the cylinders and control pump 100 is produced by a hydraulic pump and a drive assembly (not shown in FIG. 2) which is similar to pump 52 and drive assembly 52, 54, 58 shown in FIG. 1.

The primary difference between pump 100 shown in FIG. 2 and pump 10 shown in FIG. 1 is the valve arrangement. In pump 100 one of cylinders 102, 104 is connected to outlet 124 during the entire discharge or pumping stroke. In contrast, in pump 10 outlet valves 30, 32 only open as soon as the material within the cylinder has compressed to a pressure level at which the outlet pressure and the pressure of material within the material cylinder are equal. As discussed later, the system of the invention can be used with either pump 10 or pump 100, with some differences in the parameters being sensed to accommodate the differences in operation of the two valve assemblies.

Figure 3:
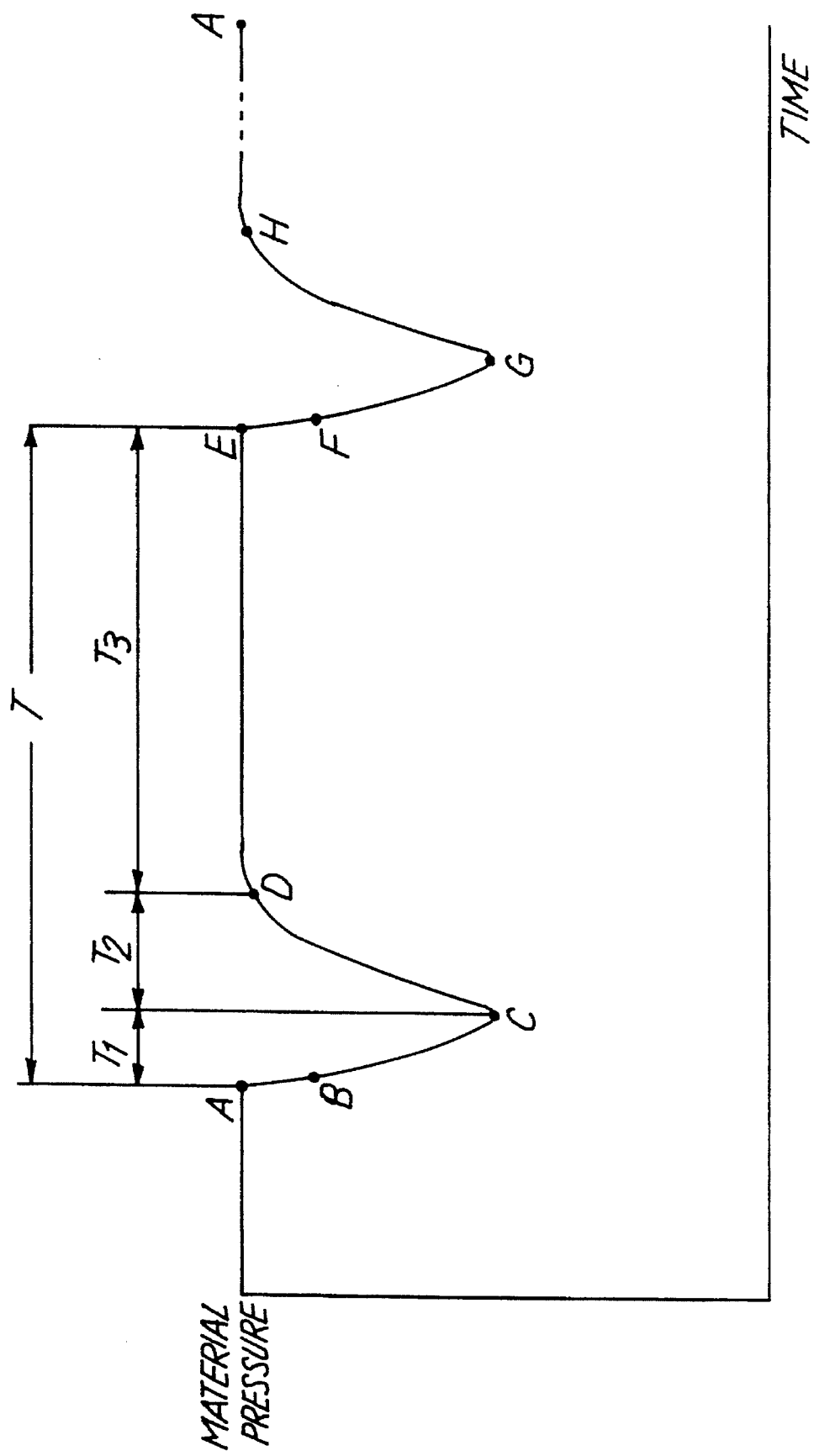
FIG. 3 shows a graph of hydraulic pressure as a function of time in a two-cylinder sludge pump as shown in FIG. 1, FIGS. 4 to 7 show block diagrams of various display systems for determining individual and total volumes of sludge conveyed by the pump.
Figure 8:
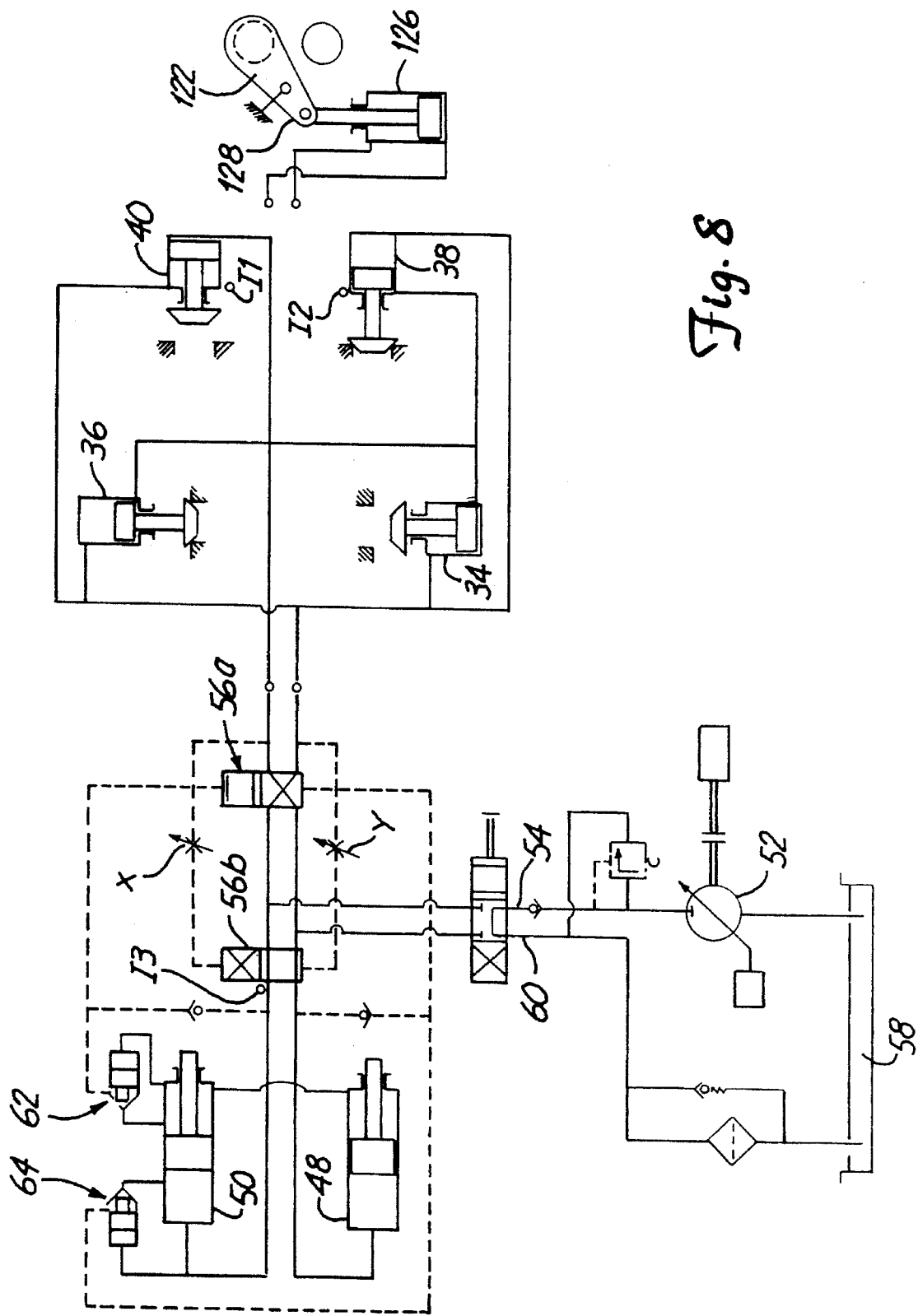
FIG. 8 shows a hydraulic circuit diagram for control of the sludge pump of FIGS. 1 and 2.

FIG. 3 shows a graph of material pressure as a function of time in a two-cylinder sludge pump of the type shown in FIG. 1. A pumping cycle starts at point A, at which one of the pistons is at its forwardmost position and the other piston is at its rearwardmost position. As already described above and particularly apparent from the wiring diagram in FIG. 8, one of valves 62, 64 gives a switching pulse to spool valve 56a depending on the piston position. Said spool valve then clears the way for the opposite pressurization of the poppet valve drive cylinders and on the other hand provides a switching pressure pulse to spool valve 56b at a delay via throttle valves (X, Y) for opposite pressurization of hydraulic drive cylinders 48, 50.

The throttle valves should be set in such a way, i.e. delay the switching of spool valve 56b to such an extent, that the valve cylinder operation and the switching of spool valve 56b take place in direct succession.

The sequence of operations starting at point A is essentially as follows.

From A to B spool valve 56a switches. From B to C the two sludge poppet valves that were open before first close and then spool valve 56b switches, which means that at point C all four poppet valves are closed and the pistons in cylinders 48, 50 begin their motion in opposite directions. That is, the cylinder which was filling before begins its pumping stroke and the other cylinder which was pumping before begins its filling stroke. From C to D the still compressed sludge in the now filling cylinder is first allowed to at least partially decompress before the associated suction valve can open, and in the now pumping cylinder there is a compression of the previously drawn-in sludge approximately to the level of the pipeline pressure, which leads to opening of this popper pressure valve. Strictly speaking, this poppet pressure valve opens somewhat earlier due to the additionally acting hydraulic pressurization of the poppet valve drive cylinder. But this quantity is negligible. At point D until end E of the pumping stroke the sludge flows through the delivery pipe at constant pressure and at constant velocity.

Operation of a pump of the type shown in FIG. 2 will produce a similar graph of material pressure versus time.

As shown in FIG. 3, total time T of a pumping cycle includes several time components relevant for determining the effectively pumped volumes and the percentage fill. Time T1 is the time from point A to point C, i.e. from the end of motion of the piston until the closing of the poppet valves.

Time T2 is the time from point C to point D, i.e. from the beginning of motion of the pumping piston until the pressure of the sludge in the cylinder has built to a point where it approximately reaches the outlet pressure so that the flow of material will be out of the cylinder into the outlet. Time T3 is the time from point D to point E, during which material is being continuously pumped out of the material cylinder into the outlet.

A single-cylinder pump will have a similar type of curve, except that there will be a time period during which the piston is moving rearward on a filling stroke and no pumping stroke is taking place. In a two-cylinder pump (as considered here) of the type shown in FIGS. 1 and 2 the material cylinders and pistons alternate filling and discharging cycles so that there is always one cylinder and piston in a pumping stroke while the other is in a filling stroke.

By comparing times T2 and T3 it is possible to determine a percentage fill of material in a cylinder during a particular pumping stroke. The percentage fill is:

Percentage fill=$T3/(T2+T3)$

This assumes of course that the piston is moving at an essentially constant velocity. By knowing the percentage amount of one pumping cycle and the total volume of this cylinder, the volume pumped during a particular cycle can be determined. By adding together the pumped volumes for multiple cycles, an accumulated volume can be determined.

On the other hand, by knowing the entire volume of a time period over which that volume has been determined, an average pumping rate can be calculated. An instantaneous pumping rate for each cycle can also be determined. By knowing the total time T of a cycle, the percentage fill and the total volume when the cylinder is 100% filled, the instantaneous pumping rate for each individual cycle can be determined.

Figure 4:
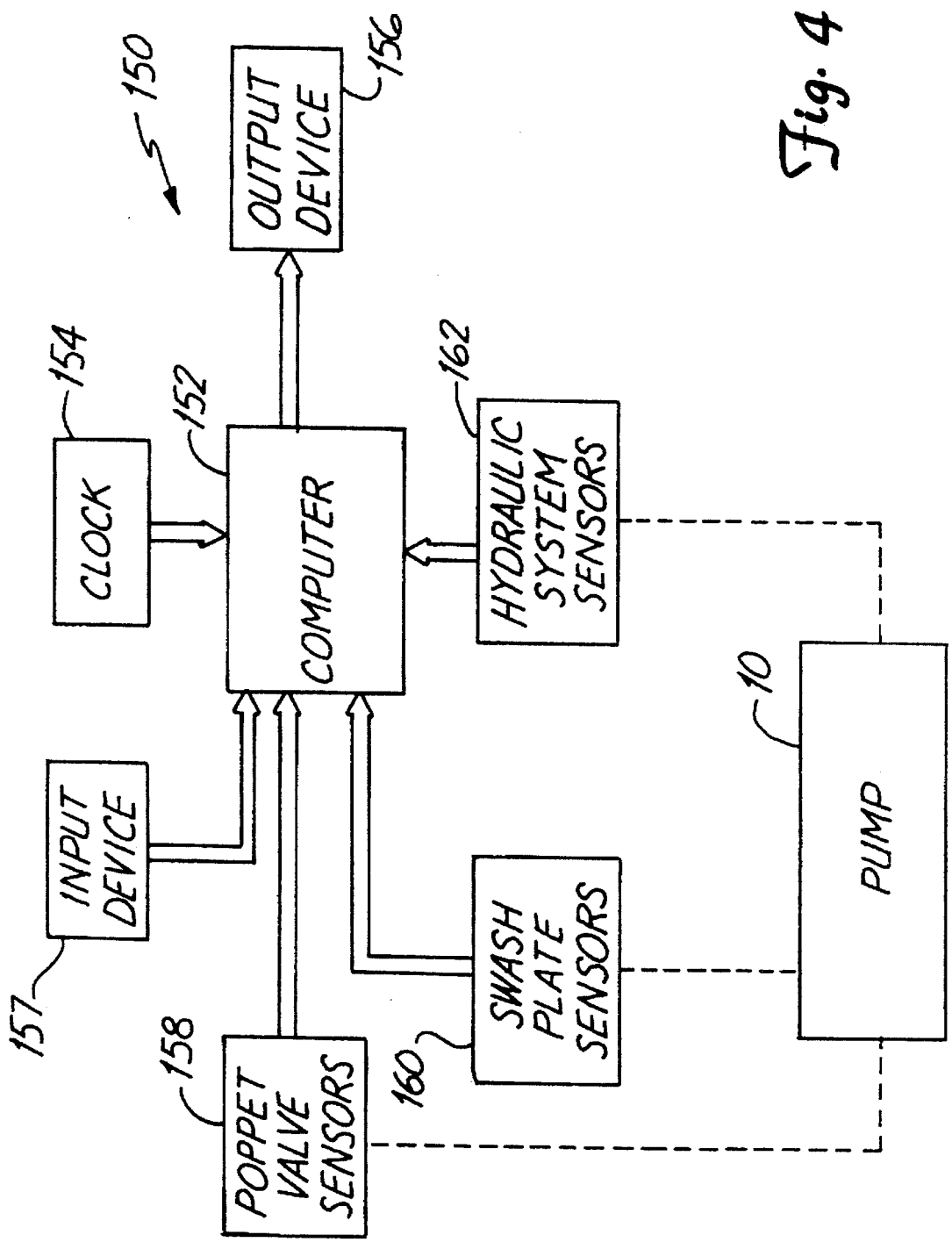

FIG. 4 shows a first embodiment of the invention in which operation of pump 10 is monitored by system 150 to provide an accurate measurement of volume pumped on a cycle-by-cycle basis and on an accumulated basis. Monitor system 150 includes digital computer 152, which in a preferred embodiment is a microprocessor including associated memory and input/output circuitry, clock 154, output device 156, input device 157, poppet valve sensors 158, hydraulic pump swash plate position sensors 160, and hydraulic system monitoring sensors 162.

Clock 154 provides a time base for computer 152. Although shown separately in FIG. 4, clock 154 is, in a preferred embodiment of the invention, contained as a part of digital computer 152.

Output device 156 takes the form for example of a cathode ray tube or liquid crystal display, a printer, or communication devices which transmit the output of computer 152 to another computer-based system, which may for example be monitoring the overall operation of facility where sludge pump 10 is being used.

Sensors 158, 160, 162 monitor the operation of pump 10 and provide signals to computer 152. The parameters sensed by sensors 158, 160, 162 provide an indication of the percentage fill of the cylinder during each pumping stroke of pump 10 and allow computer 152 to determine the time period of the cycle. From this information computer 152 determines the volume of material pumped during that particular cycle, the accumulated volume, the pumping rate during that cycle, and an average pumping rate over a selected period of time. Computer 152 stores the data in memory, and provides a signal to output device 156 based upon the particular information selected by input device 157.

In one preferred embodiment of the invention the determination of volume pumped during a pumping cycle is as follows. Hydraulic system sensors 162 provide an indication to computer 152 of the start of each pumping stroke in pump 10. Sensors 162 also provide a signal as soon as the pumping stroke ends. These signals are supplied to computer 152 by sensors 162 preferably in the form of interrupt signals.

Poppet valve sensors 158 sense when the outlet valve is open during a pumping stroke. The signal from poppet valve sensors 158 is also preferably in the form of an interrupt signal to computer 152.

Swash plate position sensors 160 on the hydraulic pump sense the flow rate of hydraulic fluid from the hydraulic pump. The swash plate position determines the flow rate, and the output of position sensor 162 can be an analog signal to computer 152 which cooperates with an analog-to-digital converter, whereby the computer can convert it into a flow rate.

Based upon the signals from sensors 158, 160, 162 computer 150 knows the beginning of each pumping stroke, the point in time when the outlet poppet valve opens, and the end of the pumping stroke. By using the clock signal from clock 154 computer 152 is able to determine times T2 and T3. As long as the pumping rate is not changed by the operator in the middle of a pumping cycle, the ratio of T3 to (T2+T3) will provide an accurate representation of the percentage fill during that pumping cycle. Swash plate position sensors 160 are intended to indicate to computer 152 whether the piston velocity has remained essentially constant through the cycle. Otherwise, adjustments must be made because the ratio to determine the percentage fill is actually the ratio of the length of pumping stroke with the material fully compressed to the length of the total piston stroke. The use of times T2 and T3 instead of the end positions of the piston is therefore based on the assumption that the piston is moving at an essentially constant velocity.

In a preferred embodiment of the invention computer 152 calculates for each stroke the percentage fill. Knowing the total displacement volume of the cylinder, computer 152 calculates the actual volume pumped during each cycle. That volume is stored in a register within the memory of the computer. Computer 152 thereby updates the register which keeps an accumulated total of volume pumped.

Because computer 152 also determines the length of time during each cycle and the accumulated time over which the accumulated volume has been pumped, it can calculate an instantaneous pumping rate for each cylinder, as well as an average pumping rate over the accumulated time.

All four values (volume pumped in a particular cycle, total volume, instantaneous pumping rate, and average pumping rate) can be displayed by output device 156. Typically the operator will select the particular information to be displayed by providing a command through input device 157 to computer 152.

Figure 5:
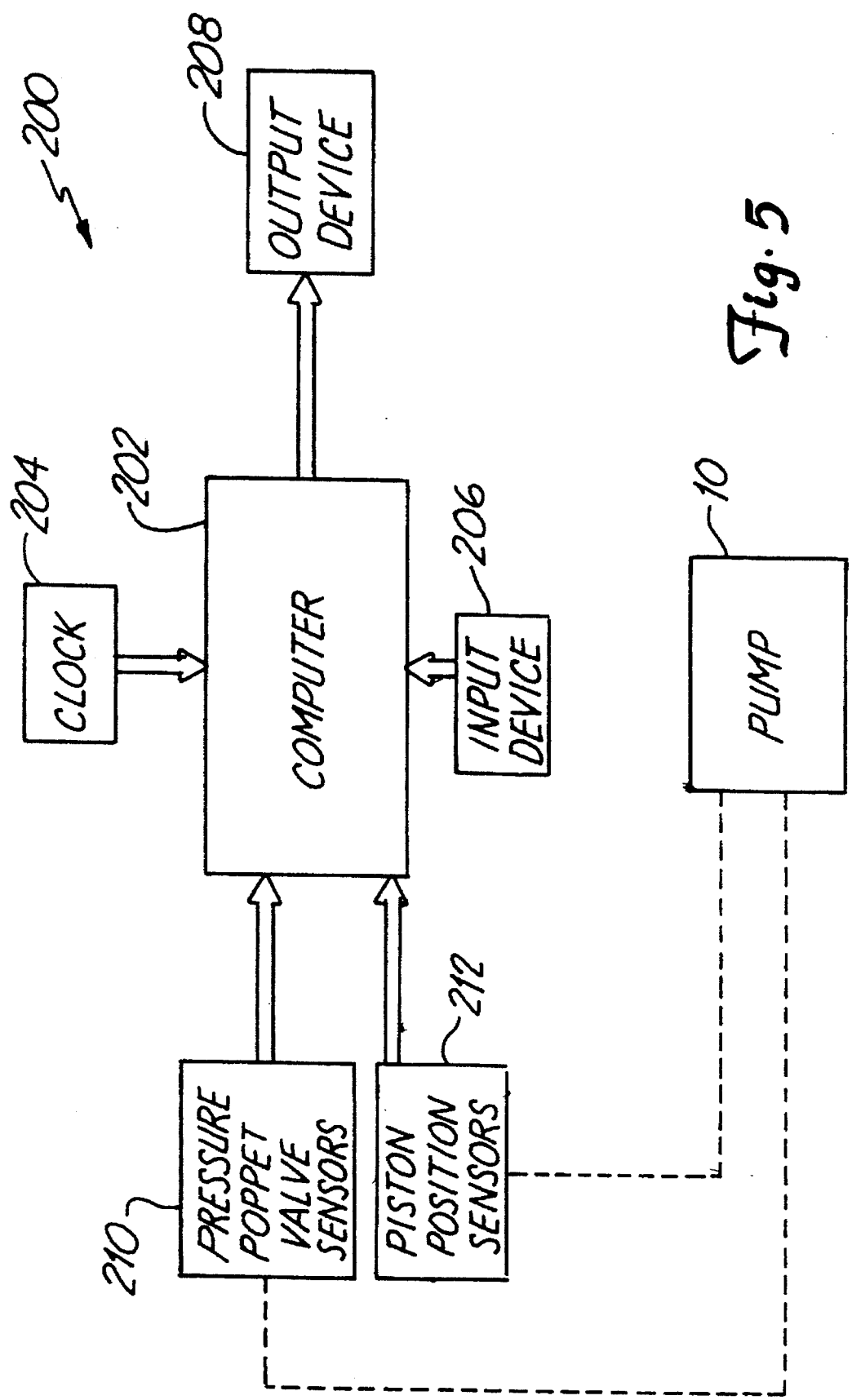

FIG. 5 shows another embodiment of the invention in which display system 200 shows the operation of pump 10. In this embodiment display system 200 includes computer 202, clock 204, input device 206, output device 208, pressure poppet valve sensors 210, and piston position sensors 212.

In the embodiment shown in FIG. 5, piston position sensors 212 sense the position of each of the pistons of pump 10 during the pumping stroke. From the signals supplied by the piston position sensors the starting and stopping points of each pumping stroke are known. The signals from the piston position sensors are, in a preferred embodiment of the invention, digital signals. For example piston position sensors 212 are preferably linear position sensors, which may be analog sensors and cooperate with an analog-to-digital converter so that the signal supplied to computer 202 is in digital form.

As soon as the pressure popper valve opens, as indicated by pressure poppet valve sensor 210, the value being read by piston position sensor 212 is supplied to the computer. The distance from the start of the pumping stroke to the opening of the pressure poppet valve is distance L1, while the distance from the opening of the pressure poppet valve to the end of the pumping stroke is L2. The percentage fill, in that case, is Percentage fill=$L1/(L1+L2)$ Clock 204 provides a time base to the computer so that the instantaneous and average pumping rate values can be calculated. As in system 150 shown in FIG. 4, in system 200 of FIG. 5 the volume pumped during a particular pumping cycle, accumulated volume pumped, instantaneous pumping rate, and average pumping rate are calculated by computer 202 and stored in appropriate registers of its memory.

Upon commands supplied by input device 206 to the computer any or all of these calculated values can be displayed by output device 208. On the other hand, output device 202 can be a transmitter which sends the information to another computer of another system which is monitoring the operation of a facility in which pump 10 is being used.

Figure 6:
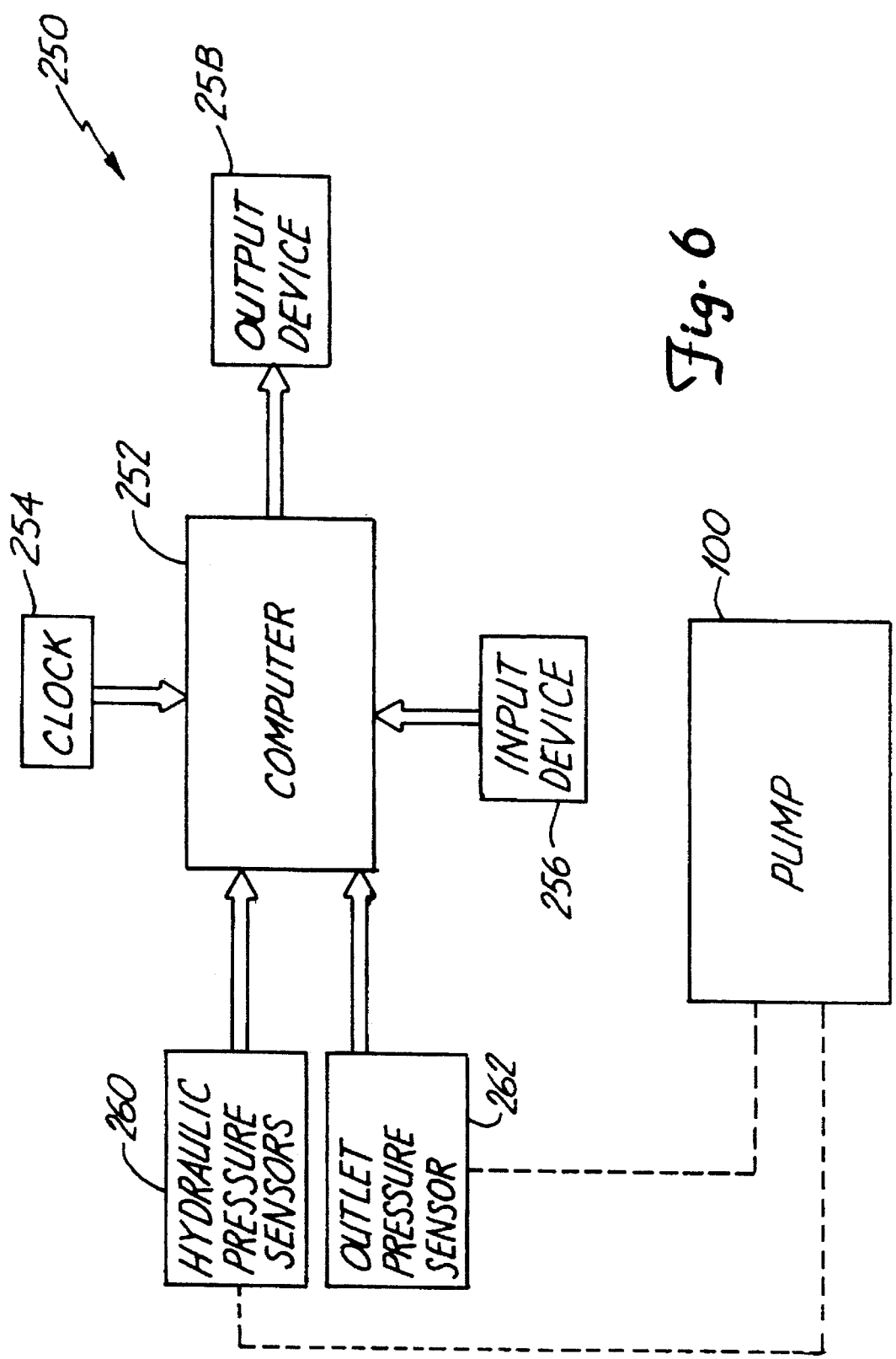

FIG. 6 shows a monitoring system 250 which is used to monitor gate-controlled pump 100 (shown in FIG. 2). Because there are no poppet valves here in which to indicate the point at which pressure within the material cylinder equals the outlet pressure in pump 100, this information must be obtained by sensing different parameters.

Monitoring system 250 includes computer 252, clock 254, input device 256, output device 258, hydraulic pump pressure sensor 260, and outlet pressure sensor 262. In this embodiment the computer receives analog or digital signals from pressure sensors 260, 262. When the hydraulic pump pressure on the high-pressure side reaches a pressure that corresponds, with consideration of the piston area transmission ratio between the hydraulic drive cylinder and the material cylinder, to the outlet pressure of the sludge which is sensed by outlet pressure sensor 262 or at a point downstream from outlet 124, the computer notes the time during the pumping cycle. It determines, at the end of the pumping cycle, the ratio or percentage fill by dividing T3 by the sum of (T2+T3).

As in the embodiment of FIG. 4, system 250 assumes that the piston is moving at a constant velocity during the pumping stroke. For further accuracy, a swash plate position sensor similar to sensor 160 of FIG. 4 can be added to system 250.

As with the embodiments shown in FIGS. 4 and 5, system 250 calculates and stores volume during each cycle, accumulated volume, instantaneous pumping rate, and average pumping rate. That information is outputted by output device 258 upon command from input device 256.

Figure 7:
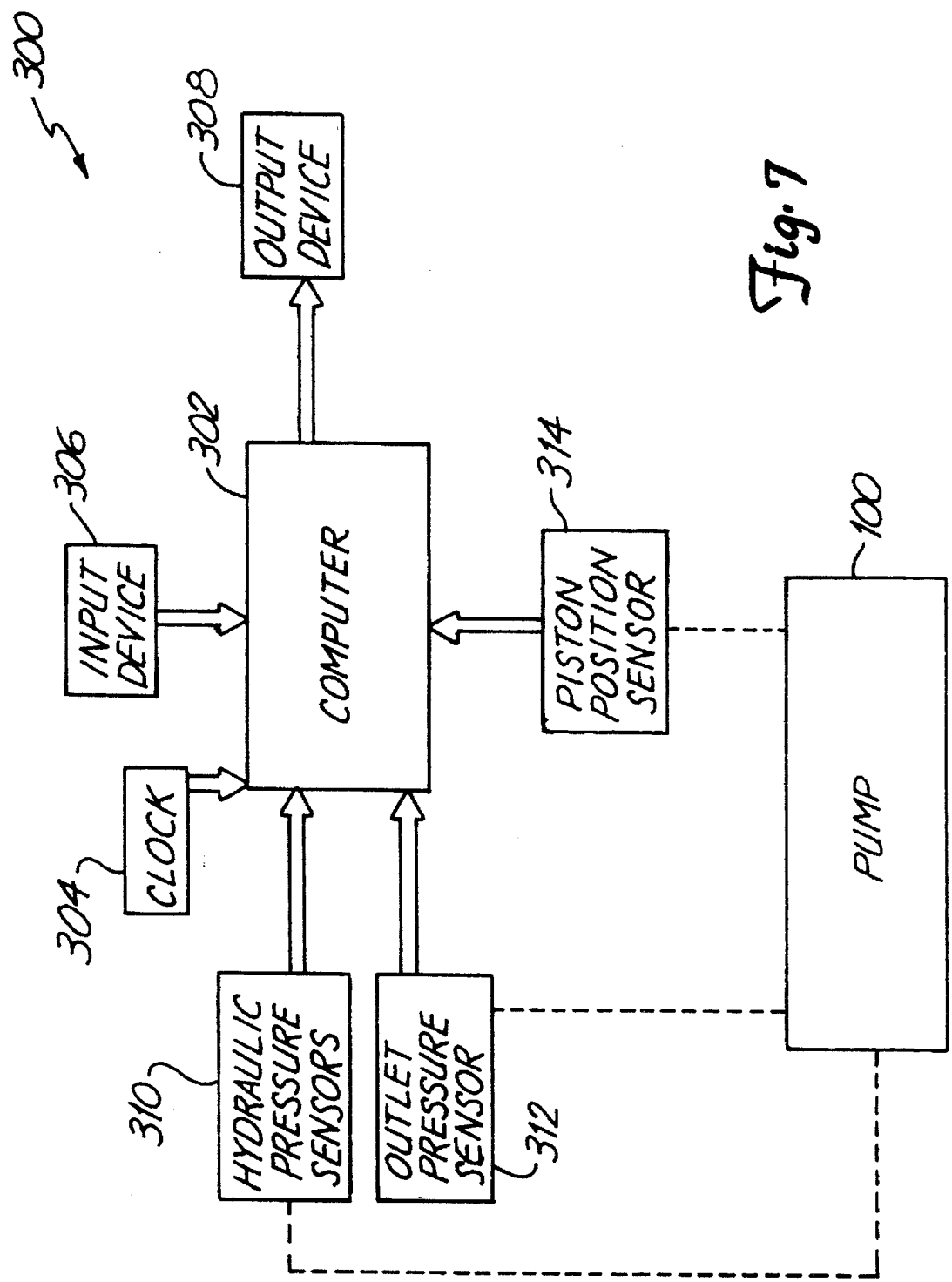

FIG. 7 shows monitoring system 300 which monitors the operation of pump 100. System 300 includes computer 302, clock 304, input device 306, output device 308, hydraulic pressure sensors 310, outlet pressure sensor 312, and piston position sensor 314. In this embodiment computer 302 reads the position of the piston at the beginning of each pumping cycle and at the end of each pumping cycle, and during the position and time in which the hydraulic pump pressure from sensor 310 exceeds or equals the outlet pressure which is equivalent with consideration of the piston area transmission ratio and which is sensed by outlet pressure sensor 312. System 300 calculates and stores the same information which has been described with regard to systems 150, 200, 250 in FIGS. 4 to 6.

Still other embodiments of the invention are possible. For example, by sensing pump pressure and determining the change of slope of the pressure curve shown in FIG. 3 it is possible to determine the point within the cycle at which the pressure within the cylinder equals or exceeds the outlet pressure. By continually monitoring the hydraulic pump pressure and performing a slope analysis, an outlet pressure sensor (such as pressure sensor 312 shown in FIG. 7) is not necessary in some embodiments.

In conclusion, the methods/embodiments described above permit accurate volume and pumping rate measurement of a sludge pump. The invention recognizes that in a positive-displacement sludge pump the filling percentage of the pumping cylinder can change from cycle to cycle. By monitoring the percentage fill on a cycle-by-cycle basis, highly accurate measurement of material delivered during each cycle, accumulated volume delivered, instantaneous pumping rate, and average pumping rate can be provided.

Beyond what is described above, FIG. 1 shows that the sludge can not only be supplied from store tank 1, 120 but also conveyed into inlets 12, 14 by means of continuous transporter 314.

Continuous transporter 314 has in a certain embodiment, as shown, a pair of shafts 320, 322 which are equipped with cutters 324 for conveying the sludge toward inlets 12, 14 of pump 10. Shafts 320, 322 are driven by hydrostatic continuous transporter drive 326.

The continuous transporter drive is controlled by valve block 56 in the way described in the following.

When e.g. piston 24 moves toward valve housing 42 and pumps sludge into outlet 16, and piston 22 simultaneously moves away from valve housing 42 thereby drawing sludge into cylinder 18 via inlet 12, the continuous transporter is in operation, i.e. it feeds sludge to inlet 12. When the pistons have reached their end positions the pumping stroke and the filling stroke are at the end and the continuous transporter is stopped. Only when all valves are reversed, i.e. when the material pistons start running again, this time in the opposite direction, is the continuous transporter switched on again.

The link between valve block 56 and continuous transporter drive 326 is shown schematically by broken line 350.

To make it easier to understand the inventive fully automatic integrated sludge pump control system described below, reference is first made to the diagram in FIG. 9.

---

$T_{10}$ = duration of cycle of cylinder 1 (pumping stroke) = AE
$T_{20}$ = duration of cycle of cylinder 2 (pumping stroke) = EA
Point A: material piston reaches end position
Point B: spool valve 56 a has switched
Point C: all poppet valves have closed and directly thereafter material pistons start in other direction, suction valve opens
Point D: compression stroke is finished, pressure valve opens, flow of material begins from pump into delivery pipe
Point E: like point A

---

Functional sequence during the cycle time

AB: spool valve 56a switches over
BC: open poppet valves close and spool valve 56b then switches over
Note:
The reaching per se and the times when the poppet valves (in particular the pressure valve) reach their closed end positions and spool valve 56b reaches its end position are detected by the approach of the particular pistons of the valves to proximity initiators as indicator pulses $I1_b$ or $I2_b$ (poppet pressure valves) and I3 (spool valve 56b) and passed on to the computer for computation or possibly for correction of the throttle valve settings.
CD: the pumping piston moves forward thereby compressing the previously drawn-in sludge to the pressure at the outlet of the pump, and the filling piston simultaneously moves backward thereby relieving (decompressing) the sludge compressed by the previous pumping stroke, whereby the poppet suction valve opens.
DE: the poppet pressure valve opens so that the effective pumping stroke runs.
Note:
The time when the pressure valve begins to open is passed on to the computer as indicator pulse (the piston moves away from the proximity initiator) $I2_a$ or $I1_a$.

---

Time intervals EF, FG, GH and HA are analogous to time intervals AB, BC, CD and DE, but for the other pump cylinder.

Figure 9:
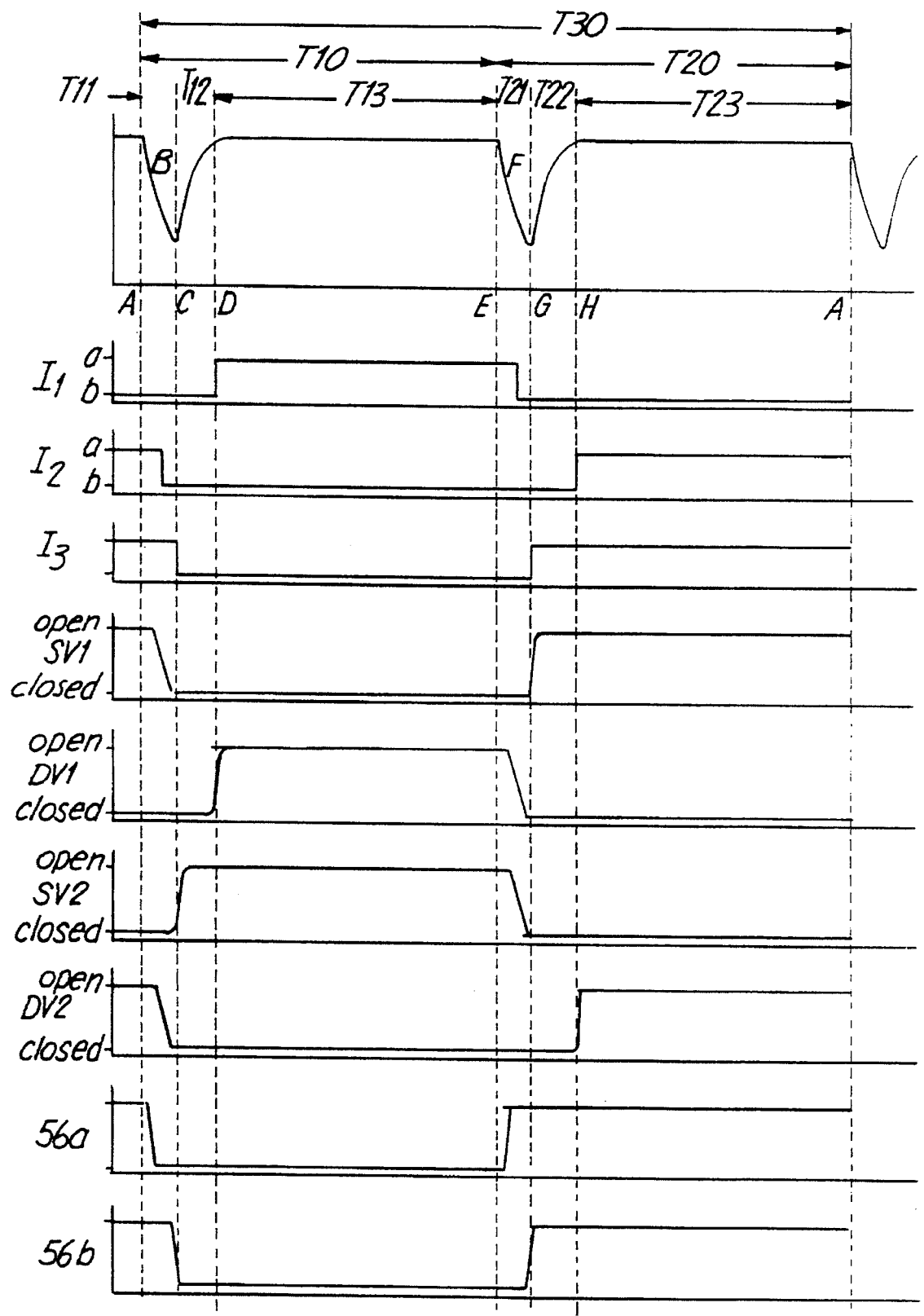
FIG. 9 shows a time lapse diagram with time on the abscissa and pressure of the sludge over the functions of the throttle and control valves on the ordinate.
Figure 10:
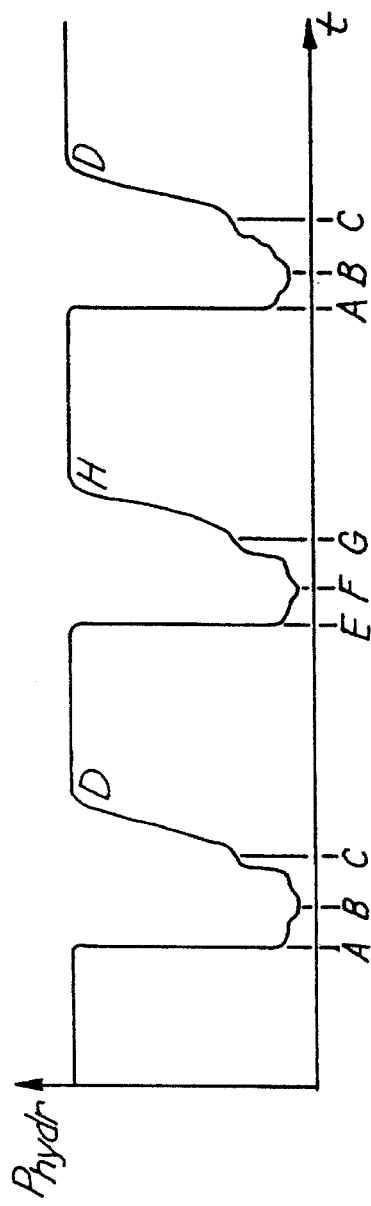
FIG. 10 shows a time lapse diagram with time on the abscissa and hydraulic pressure of the hydraulic drive of a sludge pump controlled with poppet valves on the ordinate.
Figure 11:
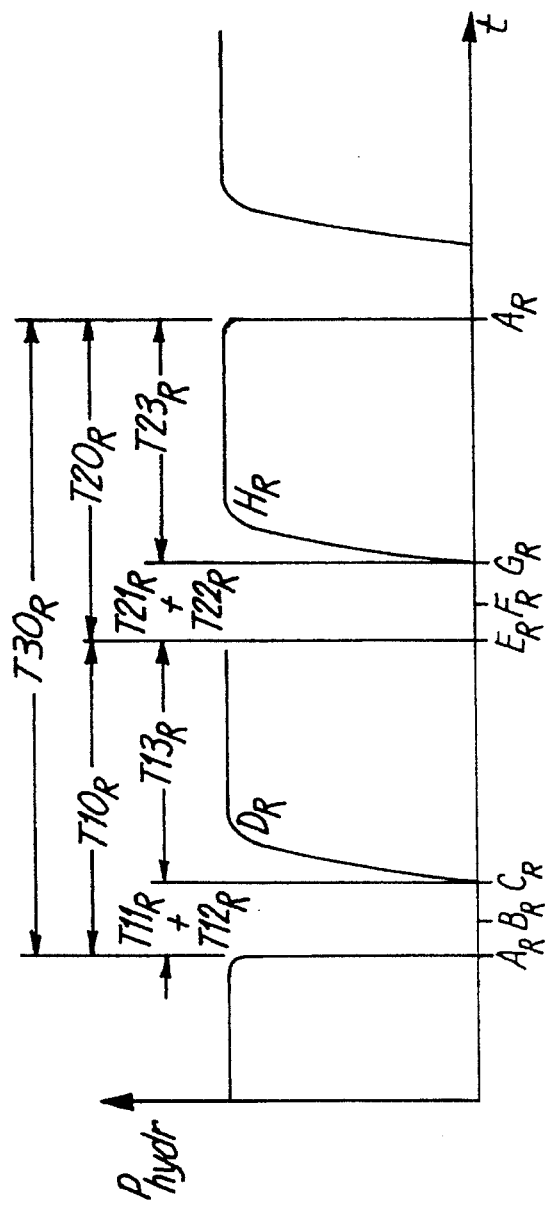
FIG. 11 shows for comparison a representation, corresponding to FIG. 9, of the fluid pressure pattern over time for a gate-controlled two-cylinder sludge pump.

The corresponding pressure pattern of the hydraulic drive fluid is shown in the diagram of FIG. 9. When the pump is not controlled with poppet valves but with a pivoting transfer tube or gate there is a corresponding pressure pattern that is shown in the diagram of FIGS. 10 and 11.

Figure 12:
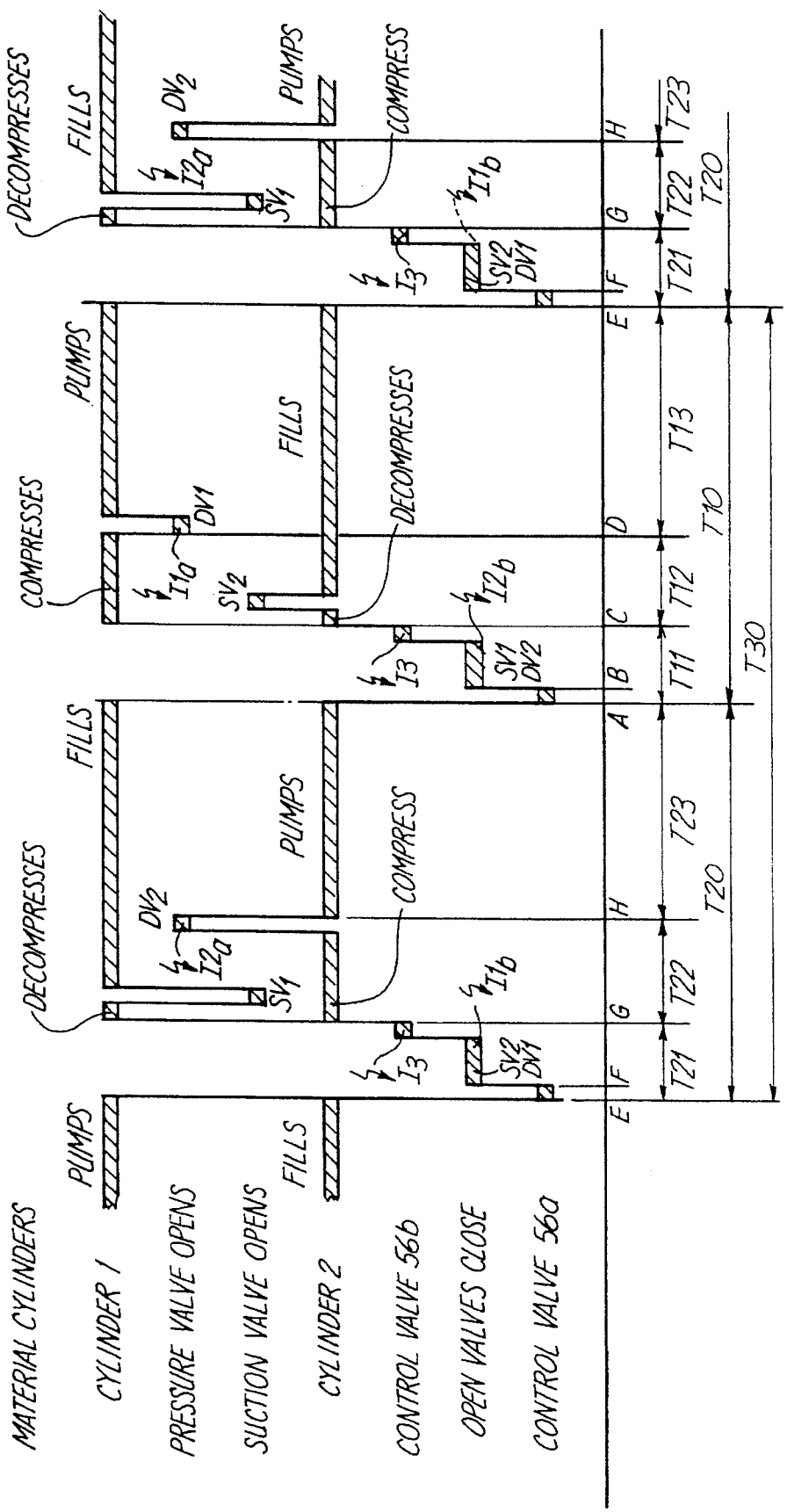
FIG. 12 shows a bar chart for the diagram of FIG. 9.

However, the bar chart of FIG. 12 is more helpful for a better understanding. It will therefore be referred to in the following.

The following parameters are thus determined as follows:

Volumetric efficiency ηvol total [%]

$\eta vol_1 = T_{13}/(T_{12}+T_{13}) \cdot 100$ [%] (for cylinder 1)

$\eta vol_2 = T_{23}/(T_{22}+T_{23}) \cdot 100$ [%] (for cylinder 2)

ηvol total = (ηvol$_1$+ηvol$_2$)/2

It is recommendable to correct values every two strokes.
Theoretical pumping rate $Q_{theoretical}$ [m³/h]

$Q_{theor} = (n \cdot v_z \cdot 60)/1000$ [m³/h]

wherein $V_z$ = piston-swept volume of one material cylinder of sludge pump in [dm³] (is inputted as fixed value depending on type of pump)

n = number of single strokes, i.e. indicator signals $I_3$, per minute

The piston-swept volume can be between about 3 and 1,000 liters (content of material cylinder).

The numbers of strokes can be between about 0.5/min and 35/min.

The theoretical pumping rate is expediently calculated every two strokes.

Determination of times T20, T21, T22, T23 or corresponding times of following stroke T10, T11, T12, T13

The theoretical total time of a stroke ($T_{20}$ or $T_{10}$) can be calculated from the amount of oil supplied by the hydraulic pump Q hydr$_{theor}$ [l/min]

and the consumed amounts of the differential or hydraulic cylinders (VD) and the total amount of switching oil (VS) (amount of switching oil) for control valves 56a/56b and the poppet valve drive cylinders) as follows:

$$T_{10}=T_{20}=((VD+VS)/Q \text{ hydr}_{theor})\cdot 60 \text{ [sec]}$$

For comparison the total time of a stroke is measurable and corresponds to the time between two functionally identical indications of two successive strokes, e.g. between $I1_a$ and $I2_a$=T20 or between $I2_a$ and $I1_a$=T10.

Time T22, which corresponds to time T12, is measured as the time interval between pulses I3 and $I2_a$ or I3 and $I1_a$.

Time T21 or T11 is calculable from the ratio of the amount of oil consumed for this period and the amount of oil consumed for the total cycle. The amount of oil consumed for the total cycle is known from the abovementioned formula for calculating total time T20 or T10, namely Total amount of consumed oil=$VD+VS$ The amount of oil consumed in time T21 or T11 is only part of the total amount of switching oil, namely $VS_1$, that is required for switching control valves 56a and 56b and closing two poppet valves. The consumption of the remaining amount of switching oil, namely $VS_2$, for opening the other two poppet valves falls within time interval T22 or T12.

The following relations thus hold for calculating times T21 or T11 with a hydraulic single-line circuit:

Total consumption of switching oil=$VS=VS1+VS2$

Differential cylinder oil consumption=$VD$

Total oil consumption=$VD+VS$

Oil consumption for partial cycle $T21$ or $T11=VS1$

It follows that:

$$T_{21}/T_{20}=T_{11}/T_{10}=VS_1/(VD+VS)$$

$$T_{21}=T_{20}\cdot(VS_1/(VD+VS))$$

or $$T_{11}=T_{10}\cdot(VS_1/(VD+VS))$$

Since the oil consumption values for each machine are invariable values they can be combined into a pump-specific factor $$f=VS_1/(VD+VS)$$

from which follows:

$$T_{21}=T_{20}\cdot f$$

$$T_{11}=T_{10}\cdot f$$

Factor f must be inputted for the particular type of pump used. Times T23 or T13 are ultimately determined from the summation formulae $$T_{20}=T_{21}+T_{22}+T_{23}$$

$$T_{10}=T_{11}+T_{12}+T_{13}$$

to $$T_{23}=T_{20}-T_{22}-T_{21}$$

$$T_{13}=T_{10}-T_{12}-T_{11}$$

Remark: The process j poppet (pressure valve opens) reduces the stroke rate of the material pistons, but this must be taken into account when calculating $T_{13}^*$ and $T_{23}^*$ (the effective pumping times of the first and second material cylinders in so far as a deduction must be made from times $T_{13}/T_{23}$ calculated above in accordance with the share of the consumed amount of switching oil $VS_3$ for opening a poppet pressure valve over the total oil consumption for time range HA/DE determined above.

This time deduction is calculated from $$T_{23}^*=T_{23}-\Delta T_{23}$$

$$T_{13}^*=T_{13}-\Delta T_{13}$$

whereby $VS_3$ must be inputted as the pump-specific value for the particular type of pump used. It thus follows that:

$$T_{23}^*=T_{23}-\Delta T_{23}$$

$$T_{13}^*=T_{13}-\Delta T_{13}$$

Corrected times $T_{23}^*$ and $T_{13}^*$ can thus be used to calculate the volumetric efficiencies $$\eta vol_1 \text{ and } \eta vol_2$$

by being correlated with total running time TD of the differential cylinder.

Therein, $$TD=(VD/Q \text{ hydr}_{theor})\cdot 60 \text{ [sec]}$$

so that:

$$\eta vol=(T23^*/TD) \text{ or } (T_{23}^*/TD)\cdot 100 \text{ [\%]}$$

Influence of throttle valve adjustment

The correct adjustment of the throttle valves is of crucial importance for correct measurement. At correct adjustment the actual time sequence corresponds to the time sequence shown in the bar chart.

Throttle valves open too far

Spool valve 56b switches simultaneously with or even before the closing of the previously open poppet valves. The popper valves thus close only when the pistons are already moving so that already pumped pumping medium flows back into the filling cylinder until the pressure valve is closed.

The error of measurement can be recognized by pulse $I1_b$ or $I2_b$ (closing pressure valve) occurring only later than pulse I3 (reversing spool valve 56b and thus direction of material piston). Here a fault message must appear: "Throttle valves open too far".

Throttle valves closed too far

Spool valve 56b switches only much later than the closing of the previously open valves. The throttle pressure thereby becomes so high that a check valve or safety valve (not shown) responds so that oil flows off to the tank. The time interval between pulse $I2_b$ or $I1_b$ and pulse I3 is measured. In a preferred embodiment, if a time portion f* of much more than f/2 is exceeded a fault message must appear: "Throttle valve closed too far". f* should be adjustable by potentiometer between f/2 and 2f; a fixed value can possibly be inputted after presentation of test results with the sludge pump system of the present invention. First adjustment which triggers fault message when reached: f*=f.

Measured values

As an indication of the total duration of a working cycle proximity switches are used, as mentioned above, in the control block e.g. at both ends of spool valve 56b.

The standard proximity switches in spool valve 56b are also used for measuring the number of strokes.

They provide signal I3 as a timer signal for total duration $T_{10}$ or $T_{20}$, the signal occurring at a time shortly after point C or shortly after point G.

To indicate time D or H (beginning of discharge) a proximity switch signal on one or the other pressure valve drive piston is used to signal the beginning of opening of the particular pressure valve with $I1_a$ or $I2_a$.

To indicate the correct adjustment of the throttle valves the closing of the pressure valve is used, as also mentioned above, and pulses $I1_b$ or $I2_b$ thereby compared to pulse I3.

Comparison of cylinder filling amounts (by limiting factor X1 in percent)

If $\eta vol_1$ is not equal to $\eta vol_2$ a signal should be provided as soon as the difference between the calculated values $\eta vol_{1,2}$ for cylinder 1 and cylinder 2 is more than X1 in percent. X1 must be adjustable between 5 and 50%. First adjustment X1=10%.

When given and preset limiting value X1 is impermissibly exceeded one of the following two signals is displayed:
"Suction valve 1: feed of medium impaired" and/or
"Suction valve 2: feed of medium impaired"

Which of the two material cylinders is impaired is recognized by the computer by the position of the particular pressure valves, e.g.

Suction valve 1 is impaired if pressure valve 1 stays closed longer than pressure valve 2, i.e. $T_{12}>T_{22}$ Suction valve 2 is impaired if pressure valve 2 stays closed longer than pressure valve 1, i.e. $T_{22}>T_{12}$

Cylinder filling impaired in both cylinders (by limiting factor X2 in percent)

If the measured $\eta vol$ in both material cylinders falls below an adjusted value X2 that will be based on the particular existing operating conditions, a signal should be provided for $$\eta vol=((\eta vol_1+\eta vol_2)/2)<X2$$

Feed of medium impaired
X2 is adjustable between 90% and 30%.
First adjustment: 70%

Hydraulic drive impaired (too much leaking oil or potentiometer has come off)

The stroke rate of the material pistons of the pump is directly proportional to pumping rate Q $hydr_{theor}$ of the hydraulic pump. It results from the parameters of the particular type of sludge pump used.

If measured number of strokes n is much lower than number of strokes $n_{theoretical}$, which corresponds to the amount of oil delivered theoretically by the hydraulic pump, the total amount of leaking oil is too high.

The pumping rate of the hydraulic pump is measured by a potentiometer in the adjusting drive for regulating the pumping rate of the hydraulic pump.

A balance during the trial run of the pump under pressure largely eliminates the normal gap leakage.

If measured number of strokes n=X3×$n_{theoretical}$, and X3 falls below the value of 0.85 (15% higher gap or leaking oil losses than in trial run) a signal is provided:
"Check hydraulic drive system"

Value X3 must be available as a signal in percent for test purposes.

Poppet valve defective

If one of the poppet valves is defective, i.e. does not close properly, the delivery pressure in one stroke is much lower than in the other since part of the pumped medium/sludge does not pass into the delivery pipe but flows back into the filling cylinder (if its pressure valve is defective) or into the filling area (if the suction valve of the pumping cylinder is defective). This reduces the flow rate in the delivery pipe and accordingly reduces the working pressure during this working stroke.

If the working or hydraulic pressure is lower in the pumping stroke of cylinder 1 (2), the pressure valve of cylinder 2 (1) or the suction valve of cylinder 1 (2) is defective.

The computer compares the hydraulic pressure or the medium pressure (assuming corresponding sensors/e.g. pressure gauges) of two successive working strokes and provides the following signals:

"Pressure valve 2 or suction valve 1 defective"
on the condition p1 ≦ X4 × p2
"Pressure valve 1 or suction valve 2 defective"
on the condition p2 ≦ X4 × p1 where X4 is adjustable between 0.95 and 0.75.

First adjustment: 0.8

Remark

If the problem "too much oil leakage" occurs simultaneously, the signal "valve defective" must be suppressed since the differential cylinder piston performing its pressure stroke probably then has higher oil leakage than the piston performing its filling stroke and poppet valve leakage is not the cause of the lower flow rate of the sludge in the delivery pipe as the reason for the lower pressure.

Hydraulic drive of sludge pump defective (higher ranked in interrogation than problem "too much oil leakage")

If $T_{10}$ and $T_{20}$ (duration of working cycles) have different values this is an indication of leakage in a differential cylinder, or leakage in the switching elements, or leakage on the valve drive cylinders The computer then provides a signal:
"Wear of hydraulic components of sludge pump"
if the following conditions are met simultaneously:

the difference between $T_{10}$ and $T_{20}$ is greater than 10% and factor X5 characterizing this difference is calculated as follows:

$$T_{10}>T_{20} \text{ of } T_{20}>T_{10}$$

$$X5=((T_{10}-T_{20})/T_{20})>10\%$$

or $$X5=((T_{20}-T_{10})/T_{10})>10\%.$$

the throttle valve position is normal the cylinder filling difference is less than X1 in percent, i.e. normal other fault messages are present, such as high oil leakage or valve defective, but are suppressed in the display X5 can be preset to 5–20%.

First adjustment: 10%

I claim:

1. A method of monitoring operation of a pump for pumping partially compressible material, the pump having a first material cylinder, a first piston movable in the first material cylinder, and a pump drive for driving the first piston during working cycles which include a first cylinder delivery stroke and filling stroke, the method comprising:

sensing a first parameter which bears a known relationship to an actual volume of material displaced from the first material cylinder during the first cylinder delivery stroke;

determining a first cylinder fill efficiency based upon the sensed first parameter; and determining errors in pump operation based upon a comparison of the first cylinder fill efficiency with a comparison value.

2. The method of claim 1, wherein the pump further includes an outlet valve which controls material flow from the first material cylinder to an outlet area, and further wherein the first cylinder delivery stroke includes a compression portion, in which the outlet valve is closed and material within the cylinder is compressed, and a flow portion, in which the outlet valve is opened and material is delivered from the first material cylinder to the outlet area.

3. The method of claim 1, further including:

providing an error signal when the first cylinder fill efficiency is less than the comparison value.

4. The method of claim 3, wherein the comparison value is approximately 30% to 90%.

5. The method of claim 3, wherein the pump further includes a second material cylinder having a second piston movable in the second material cylinder, the second piston being driven by the pump drive during working cycles which include a second cylinder delivery stroke and a filling stroke, the method further comprising:

sensing a second parameter which bears a known relationship to an actual volume of material displaced from the second material cylinder during the second cylinder delivery stroke; and determining a second cylinder fill efficiency based upon the sensed second parameter.

6. The method of claim 5, wherein the comparison value is the second cylinder fill efficiency.

7. The method of claim 6, further including:

providing an error signal when the first cylinder fill efficiency exceeds the second cylinder fill efficiency by a predetermined amount.

8. The method of claim 7, wherein the predetermined amount is approximately 5% to 50%.

9. A method of monitoring operation of a pump for pumping partially compressible material, the pump having a first material cylinder, a first piston movable in the first material cylinder, a pump for driving the first piston during working cycles which include a first cylinder delivery stroke and a filling stroke, a second material cylinder, and a second piston movable in the second material cylinder, the second piston being driven by the pump drive during working cycles which include a second cylinder delivery stroke and a filling stroke, the method comprising:

sensing a first parameter which bears a known relationship to an actual volume of material displaced from the first material cylinder during the first cylinder delivery stroke;

determining a first cylinder fill efficiency based upon the sensed first parameter;

sensing a second parameter which bears a known relationship to an actual volume of material displaced from the second material cylinder during the second cylinder delivery stroke;

determining a second cylinder fill efficiency based upon the sensed second parameter;

determining a system fill efficiency based upon the first cylinder fill efficiency and the second cylinder fill efficiency; and determining errors in pump operation based upon a comparison of the system fill efficiency with a comparison value.

10. The method of claim 9, wherein the system fill efficiency is an average of the first cylinder fill efficiency and the second cylinder fill efficiency.

11. The method of claim 9, further including:

providing a warning signal when the system fill efficiency falls below the comparison value.

12. The method of claim 11, wherein the comparison value is approximately 30% to 90%.

13. A method of monitoring operation of a pump for pumping partially compressible material, the method comprising:

calculating a pump fill efficiency based upon a parameter which bears a known relationship to an actual amount of material displaced from a cylinder of the pump;

comparing the pump fill efficiency to a comparison value; and determining errors in pump operation as a function of the comparison of the pump fill efficiency to the comparison value.

14. The method of claim 13, wherein the pump has a first material cylinder, a first piston movable in the first material cylinder, and a pump drive for driving the first piston during working cycles which include a first cylinder delivery stroke and filling stroke; and further wherein calculating the pump fill efficiency includes:

calculating a first cylinder fill efficiency of the first material cylinder based upon a parameter which bears a known relationship to an actual amount of material displaced during the first cylinder delivery stroke.

15. The method of claim 14, further including:

providing an error signal when the pump fill efficiency is less than the comparison value.

16. The method of claim 15, wherein the comparison value is approximately 30% to 90%.

17. The method of claim 14, wherein the pump has a second material cylinder and a second piston movable in the second material cylinder, the second cylinder being driven by the pump drive during working cycles which include a second cylinder delivery stroke and a filling stroke, the method further including:

calculating a second cylinder fill efficiency of the second material cylinder based upon an actual amount of material displaced during the second cylinder delivery stroke.

18. The method of claim 17, wherein the comparison value is the second cylinder fill efficiency.

19. The method of claim 18, further including:

providing an error signal when the first cylinder fill efficiency exceeds the second cylinder fill efficiency by a predetermined amount.

20. The method of claim 13, wherein the pump has a first material cylinder, a first piston movable in the first material cylinder, a pump drive for driving the first piston during working cycles which include a first cylinder delivery stroke and a filing stroke, a second material cylinder, and a second piston movable in the second material cylinder, the second piston being driven by the pump drive during working cycles which include a second cylinder delivery stroke and a filling stroke; and further wherein calculating the pump fill efficiency includes:

calculating a first cylinder fill efficiency of the first material cylinder based upon a parameter which bears a known relationship to an actual amount of material displaced during the first cylinder delivery stroke;

calculating a second cylinder fill efficiency of the second material cylinder based upon a parameter which bears a known relationship to an actual amount of material displaced during the second cylinder delivery stroke; and calculating the pump fill efficiency based upon an average of the first cylinder fill efficiency and the second cylinder fill efficiency.

21. The method of claim 20, further including:

providing an error signal when the system fill efficiency is less than the comparison value.

22. A method of monitoring operation of a pump for pumping partially compressible material, the pump having a first material cylinder, a first piston movable in the first material cylinder, a pump drive for driving the first piston during working cycles which include a first cylinder delivery stroke and a filing stroke, a second material cylinder, and a second piston movable in the second material cylinder, the second piston being driven by the pump drive during working cycles which include a second delivery stroke and a filling stroke, the method comprising:

sensing a first parameter which bears a known relationship to an actual pressure of material displaced from the first material cylinder during the first cylinder delivery stroke;

determining a first cylinder delivery pressure based upon the sensed first parameter;

sensing a second parameter which bears a known relationship to an actual pressure of material displaced from the second material cylinder during the second cylinder delivery stroke;

determining a second cylinder delivery pressure based upon the sensed second parameter; and determining errors in pump operation based upon a comparison of the first cylinder delivery pressure and the second cylinder delivery pressure.

23. The method of claim 22, further including:

providing a warning signal when the first delivery pressure exceeds the second delivery pressure by a predetermined percentage related to an error in pump operation.

24. The method of claim 23, wherein the predetermined percentage is approximately 5% to 25%.

25. A method of monitoring operation of a pump for pumping partially compressible material, the pump having a first material cylinder, operation of which includes a first cylinder delivery stroke and a first cylinder filling stroke, and a second material cylinder, operation of which includes a second cylinder delivery stroke and a second cylinder filling stroke, the method comprising:

measuring a first cylinder cycle time of the first cylinder delivery stroke;

measuring a second cylinder cycle time of the second cylinder delivery stroke; and determining errors in pump operation based upon a comparison of the first cylinder cycle time with the second cylinder cycle time period.

26. The method of claim 25, further including:

providing a warning signal when the first cylinder cycle time exceeds the second cylinder cycle time by a predetermined percentage which bears a known relationship to an error in pump operation.

27. The method of claim 26, wherein the predetermined percentage is approximately 5% to 20%.

28. The method of claim 25, wherein the pump includes an inlet valve which regulates flow of material from a filling area to the first material cylinder, an outlet valve which regulates flow material from the first material cylinder to an outlet area, a valve controller which operates to control positioning of the inlet valve and the outlet valve, and a cylinder controller which controls directional movement of a piston within the first cylinder; and wherein measuring the first cylinder cycle time includes:

sensing a first parameter which bears a known relationship to a first time period for the valve controller to operate;

sensing a second parameter which bears a known relationship to a second time period for the first valve and the second valve to close; and sensing a third parameter which bears a known relationship to a third time period for the first piston to complete the delivery stroke.

\* \* \* \* \*

UNITED STATES PATENT AND TRADEMARK OFFICE
CERTIFICATE OF CORRECTION

PATENT NO. : 5,507,624
DATED : APRIL 16, 1996
INVENTOR(S) : BERTHOLD A. FEHN

It is certified that error appears in the above-indentified patent and that said Letters Patent is hereby corrected as shown below:

Col. 12, line 37, delete "$\eta vol\ total=(\eta vol_1+\eta vol)/2$", insert --$\eta vol\ total=(\eta vol_1+\eta vol_2)/2$--

Col. 12, line 63, delete "$(T_{20}\ or\ /T_{10})$", insert -- $(T_{20}\ or\ T_{10})$ --

Col. 14, line 6, delete "$T_{13}/T_{23}$", insert --$T_{13}$ and $T_{23}$--

Col. 16, line 65, delete "$T_{10}>T_{20}$ of $T_{20}>T_{10}$", insert --$T_{10}>T_{20}$ or $T_{20}>T_{10}$--

Signed and Sealed this

Tenth Day of September, 1996

Attest:

BRUCE LEHMAN

Attesting Officer

Commissioner of Patents and Trademarks